(12) United States Patent
Pruitt et al.

(10) Patent No.: US 12,376,702 B2
(45) Date of Patent: Aug. 5, 2025

(54) SYSTEM FOR CONVERSION OF A KAMADO COOKER TO A GRIDDLE

(71) Applicant: Align Machine Works, LLC, Athens, GA (US)

(72) Inventors: Joseph Pruitt, Athens, GA (US); Kyle Aasness, Athens, GA (US)

(73) Assignee: Align Machine Works, LLC, Athens, GA (US)

( * ) Notice: Subject to any disclaimer, the term of this patent is extended or adjusted under 35 U.S.C. 154(b) by 735 days.

(21) Appl. No.: 17/684,322

(22) Filed: Mar. 1, 2022

(65) Prior Publication Data
US 2023/0276988 A1    Sep. 7, 2023

(51) Int. Cl.
*A47J 37/06* (2006.01)
*A47J 36/02* (2006.01)
*A47J 36/34* (2006.01)
*A47J 33/00* (2006.01)

(52) U.S. Cl.
CPC ........... *A47J 37/067* (2013.01); *A47J 36/025* (2013.01); *A47J 36/34* (2013.01); *A47J 33/00* (2013.01)

(58) Field of Classification Search
CPC .......... A47J 36/00; A47J 36/02; A47J 36/025; A47J 36/16; A47J 36/24; A47J 36/34; A47J 36/36; A47J 37/00; A47J 37/04; A47J 37/041; A47J 37/06; A47J 37/0647; A47J 37/0658; A47J 37/0664; A47J 37/067; A47J 37/0682; A47J 37/0694; A47J 37/07; A47J 37/0704; A47J 37/0718; A47J 37/0786
See application file for complete search history.

(56) References Cited

U.S. PATENT DOCUMENTS

| | | | | |
|---|---|---|---|---|
| 6,135,014 A | * | 10/2000 | Chang | A47J 37/0763 99/449 |
| 6,389,961 B1 | * | 5/2002 | Wu | A47J 37/0694 99/446 |
| 2005/0051157 A1 | * | 3/2005 | Cuomo | A47J 36/36 126/275 R |
| 2009/0071465 A1 | * | 3/2009 | Leavens | F23D 14/065 126/39 H |
| 2012/0085768 A1 | * | 4/2012 | Renzi | A47J 37/067 220/573.1 |
| 2018/0180286 A1 | * | 6/2018 | Brennan | A47J 37/0763 |
| 2021/0228020 A1 | * | 7/2021 | Hanks | A47J 37/0786 |

* cited by examiner

*Primary Examiner* — Hung D Nguyen
(74) *Attorney, Agent, or Firm* — Smith Tempel Blaha LLC; Matthew T. Hoots

(57) ABSTRACT

Exemplary embodiments of a system for conversion of a kamado cooker to a griddle comprises a support rack and a griddle component. The support rack is configured to seat within a lower bowl portion of the kamado cooker and define a plurality of vertical post structures. The griddle component defines a sloped cooking surface and comprises a rim aspect at least partially surrounding the sloped cooking surface and a drain slot. The griddle component is configured to be received by the plurality of vertical post structures of the support rack. When in use, grease on the sloped cooking surface is directed to the drain slot which discards the grease into combusting fuel (such as charcoal) beneath the griddle component, thereby mitigating or preventing grease fires.

10 Claims, 6 Drawing Sheets

SYSTEM FOR CONVERSION OF A KAMADO COOKER TO A GRIDDLE

BACKGROUND

The present invention relates to outdoor cooking solutions and, more particularly, to a novel system for converting a kamado-style cooker into a griddle.

Kamado cookers commonly leverage a charcoal briquette fuel source. As would be understood by one of ordinary skill in the art, a volume of charcoal may be placed in a lower bowl-like portion of the kamado and lit on fire. A grilling surface, usually in the form of a grate, is suspended over the charcoal. A lid defining an upper portion of the kamado cooker seats over the grate and onto the lower bowl-like portion of the cooker. In this way, a kamado cooker is similar in concept to a typical kettle-styled grill, such as a Weber® grill—the lower portion (bowl) and the upper portion (lid) operate to define a volumetric space in which the fuel source is combusted and foodstuff on a grate is cooked.

The combustion of the charcoal fuel source is managed via dampers that control air flow into the lower bowl portion and out of the upper lid. Depending on the particular cooker (or kettle-styled grill), the damper(s) may be manually operated or automatically operated (with an electronic controller). Moreover, in some embodiments, a forced air flow generated by a fan may be controlled through the cooker in order to manage combustion and thermal energy generation from the fuel source. Regardless of the means used for managing charcoal combustion, the goal is to allow air to flow over/around/through the combusting charcoal, collect thermal energy and smoke, and exit the cooker/grill only after circulating around the cooking food.

Various and sundry accessories exist in the prior art for converting the standard cooking grate to a different purpose. For example, prior art solutions exist for converting a standard cooking grate to a griddle by simply placing a flat metal or stone cooking surface either atop, or in place of, a grilling grate. Prior art solutions for converting a standard cooking grate to a griddle, however, present problems such as inhibiting airflow through the grill and promoting grease fires on top of the griddle surface. Therefore, there is a need in the art for a griddle system that in a kamado cooker or kettle-styled grill that promotes airflow through the cooker/grill and manages grease collection in a way that mitigates or prevents unwanted grease fires.

SUMMARY

Exemplary embodiments of a system and method for converting a kamado-style cooker to a griddle cooker are disclosed. Certain embodiments are configured to be removably mounted within a kamado-styled cooker such as, but not limited to, a Kamadojoe® or Big Green Egg® ceramic cooker. Other embodiments are configured to be mounted within a kettle-styled grill such as, but not limited to, a Weber® grill. When mounted in a kamado cooker, a support rack portion of an embodiment of the solution will seat in the lower body of the cooker and provide a support for removably receiving a griddle component. In this way, thermal energy generated by a combusting fuel, such as charcoal, in the lower body of the cooker will rise and heat the griddle component which is suspended over the combusting fuel.

An exemplary embodiment of a system for conversion of a kamado cooker to a griddle comprises a support rack and a griddle component. The support rack is configured to seat within a lower bowl portion of the kamado cooker and define a plurality of vertical post structures. The griddle component defines a sloped cooking surface and comprises a rim aspect at least partially surrounding the sloped cooking surface and a drain slot. The griddle component is configured to be received by the plurality of vertical post structures of the support rack. In some embodiments, the griddle component defines a channel beneath the rim aspect that is configured to receive the plurality of vertical post structures. The rim aspect/channel may define one or more straight sections for receiving the vertical post structures and orienting the griddle component. Advantageously, the drain slot of the griddle component, when the griddle component is mounted onto the post structures of the support rack, is positioned to discard grease from the sloped cooking surface at a point beneath the griddle component.

The griddle component may comprise one or more handles which may be made of any suitable material, although it is envisioned that certain embodiments of the griddle component will have handles comprised of at least one of stainless steel and chrome. The body of the griddle component may be comprised of any material suitable for the application, however, it is envisioned that certain embodiments of the body of a griddle component may be comprised of carbon steel. Moreover, some griddle components may comprise a non-stick surface treatment.

The support rack of an exemplary system according to the solution may comprise a base frame and an upper frame that are concentric. The support frame may further comprise a center frame for added structural support and rigidity. The support rack may be comprised of any material suitable for the application, however, it is envisioned that certain embodiments of the support rack may be comprised of stainless steel and/or chrome.

DETAILED DESCRIPTION

Various embodiments, aspects and features of the present invention encompass a system and method for conversion of a kamado-style cooker (e.g., a Kamadojoe® cooker or a Big Green Egg® cooker) into a griddle.

In this description, the terms "kamado cooker," "kamado-style cooker" and the like are used interchangeably to refer to a cooker device commonly used for grilling and smoking food and constructed from a ceramic and/or a refractory material and/or a terra cotta clay and/or a composition of cement and lava rock. A common feature of a kamado cooker is that the overall shape is ovoid or "egg-like" such that the lid of a typical kamado-style cooker defines a domed interior space over a cooking grate. Notably, even though embodiments of the solution are described and illustrated in this description within the context of a "typical" kamado-style cooker having an ovoid body and ceramic materials of construction, it is envisioned that embodiments of the solution may be implemented in association with other barbecue grill designs such as, but not limited to, a kettle-styled grill (e.g., a Weber® grill) and, as such, it will be understood that the scope of the solution disclosed herein is not limited to application with a traditional or typical kamado-style cooker.

In this description, the term "griddle component" refers to a component of the solution intended for use as a solid cooking surface within a kamado cooker.

In this description, the term "support rack" refers to a wire structure or the like configured to be received into, or removably mounted within, the lower bowl-like portion of a kamado cooker and operable to receive and support, inter alia, a griddle component. The particular, non-limiting design of a support rack shown in the figures and generally described herein is a "flexible cooking rack" or "FCR" developed and marketed by KamadoJoe®.

In this description, the term "grease" is used as a reference to any byproduct of cooking foodstuffs on a griddle surface and may include any combination of rendered fat, juices, solids, marinade, water, etc.

Figure 1:
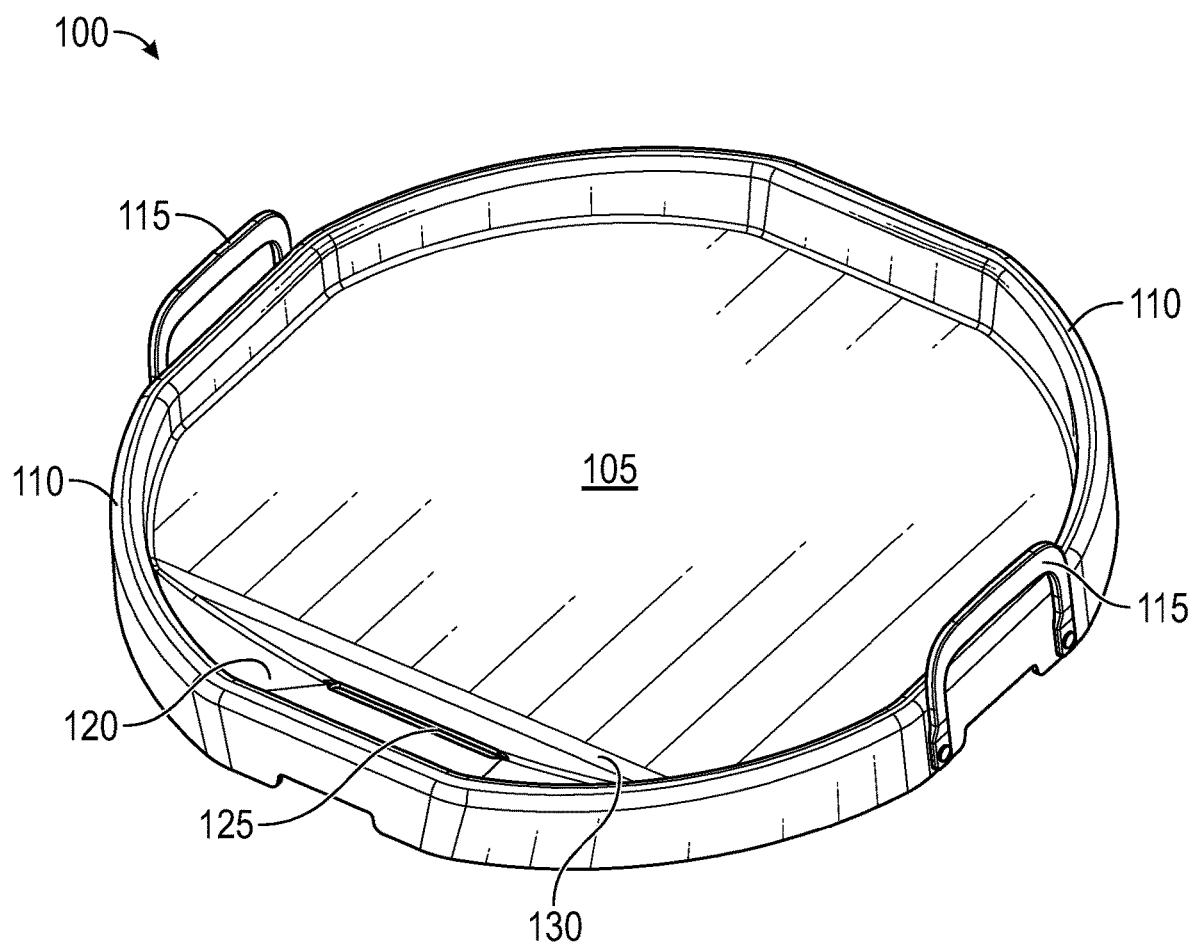
FIG. 1 illustrates an exemplary embodiment of a griddle component of a system according to the solution for conversion of a kamado cooker to a griddle.
Figure 2:
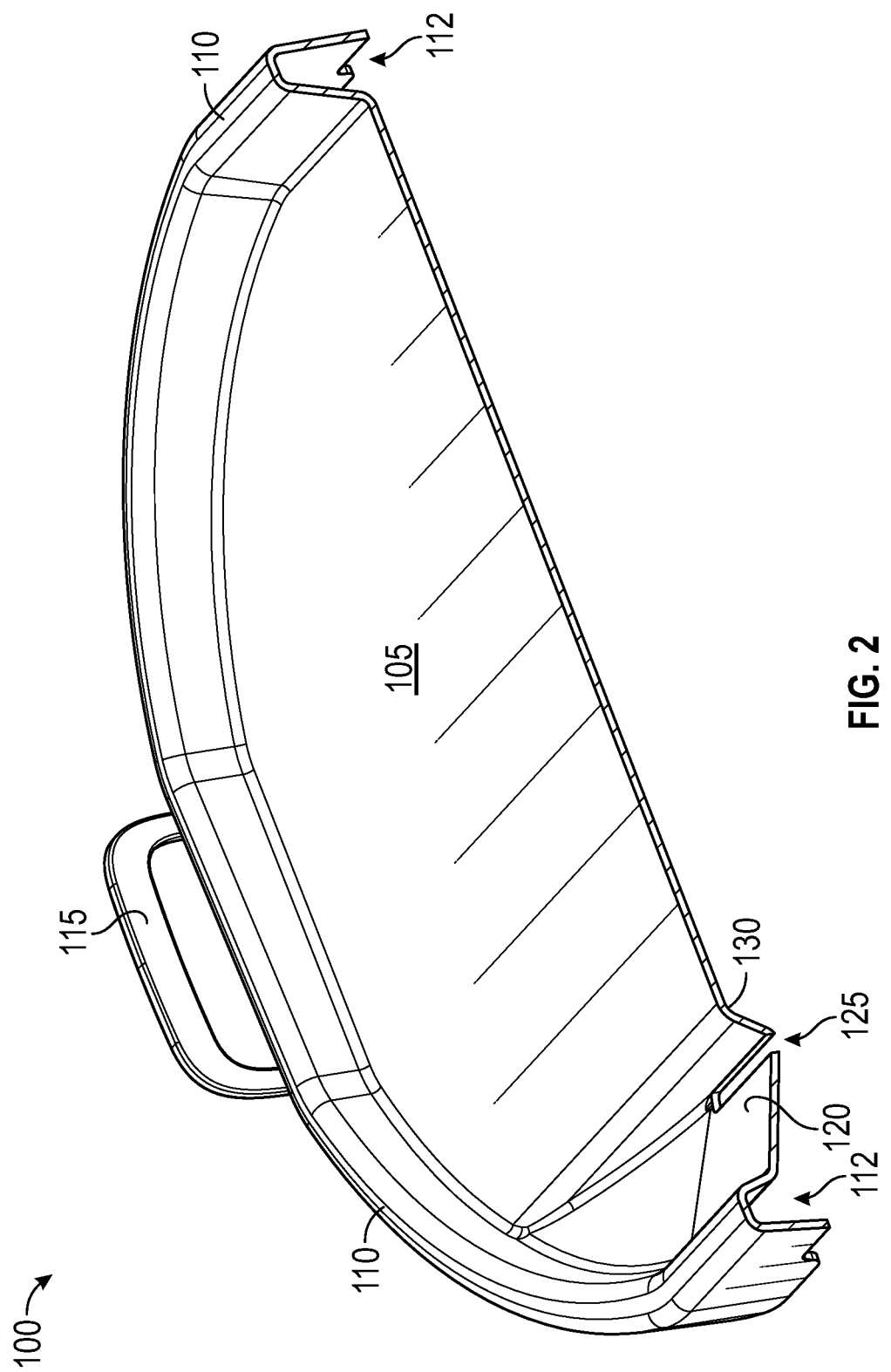
FIG. 2 is a sectioned view of the exemplary griddle component shown in FIG. 1.
Figure 3:
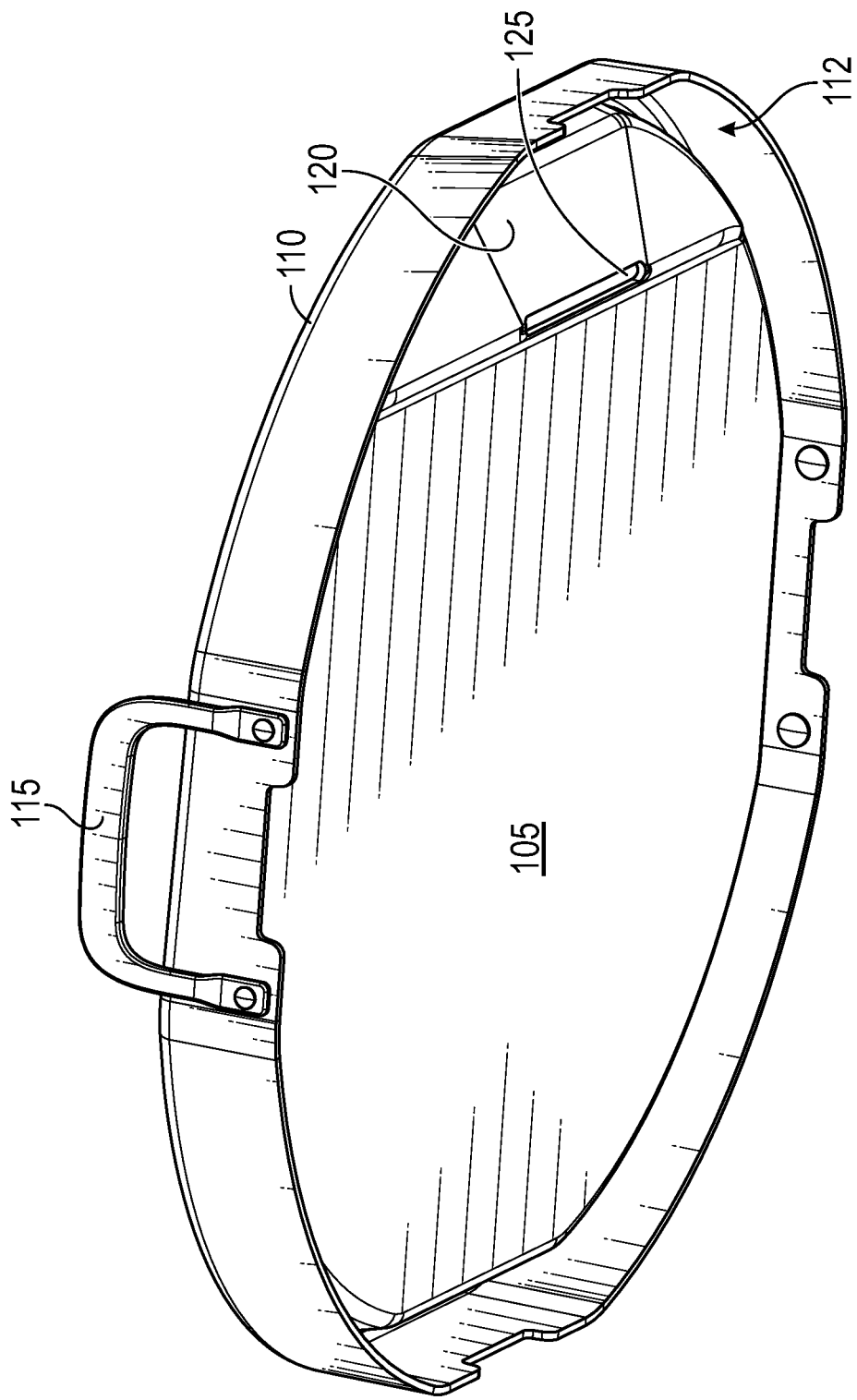
FIG. 3 is a perspective bottom view of the exemplary griddle component shown in FIG. 1.

FIG. 1 illustrates an exemplary embodiment of a griddle component 100 of a system according to the solution for conversion of a kamado cooker to a griddle. FIG. 2 illustrates a sectioned view of the exemplary griddle component 100 shown in FIG. 1. And, FIG. 3 is a perspective bottom view of the exemplary griddle component 100 shown in FIG. 1. The illustrations of FIGS. 1-3 will be described simultaneously.

The griddle component 100 comprises a substantially flat, slightly sloped (relative to horizontal) cooking surface 105. The cooking surface 105 may be treated with a non-stick surface treatment such as, for example, polytetrafluoroethylene (PTFE), silica, anodized aluminum, enamel, etc. It is envisioned that the griddle component 100 may be constructed of a base material, such as a carbon-based steel, and then coated or seasoned (whether partially or fully) for use as a cooking surface. In other embodiments, the material of construction may be itself suitable as a cooking surface without need for treatment. In yet other embodiments, a griddle component 100 according to the solution may be constructed from a combination of materials.

The griddle component 100 may include a rim 110 that extends partially or fully around the cooking surface 105. In the exemplary embodiment shown in the figures, the rim 110 extends fully around the cooking surface 105. The rim 110 may keep grease contained on the cooking surface 105 such that the grease is prevented from flowing off an edge of the cooking surface (such as may be common in prior art solutions) but is directed toward a drain slot 125 by virtue of a slope or contour to the cooking surface 105. The drain slot 125 may be at the bottom of a spatial volume beneath a lowest ledge 130 defined by the sloped cooking surface 105. A ramped surface 120, defining a slope that is counter to the slope of the cooking surface, ensures that any grease flowing over the ledge 130 is directed toward the drain slot 125 and not past it. Advantageously, because the rim 110 and sloped cooking surface 105 cooperate to direct grease to the drain slot 125, the grease is discharged beneath the griddle component 100 and into the combusting fuel (e.g., charcoal) where it is consumed. In this way, embodiments of the solution mitigate events of grease fires atop the cooking surface and/or around the edge of the cooking surface.

The rim 110 may define a channel 112 open to the underside such that the griddle component 100 may be received onto a support rack (not shown in the illustrations of FIGS. 1-3). The griddle component 100 may also include one or more handles 115 for lifting and adjusting the griddle component 100.

Figure 4:
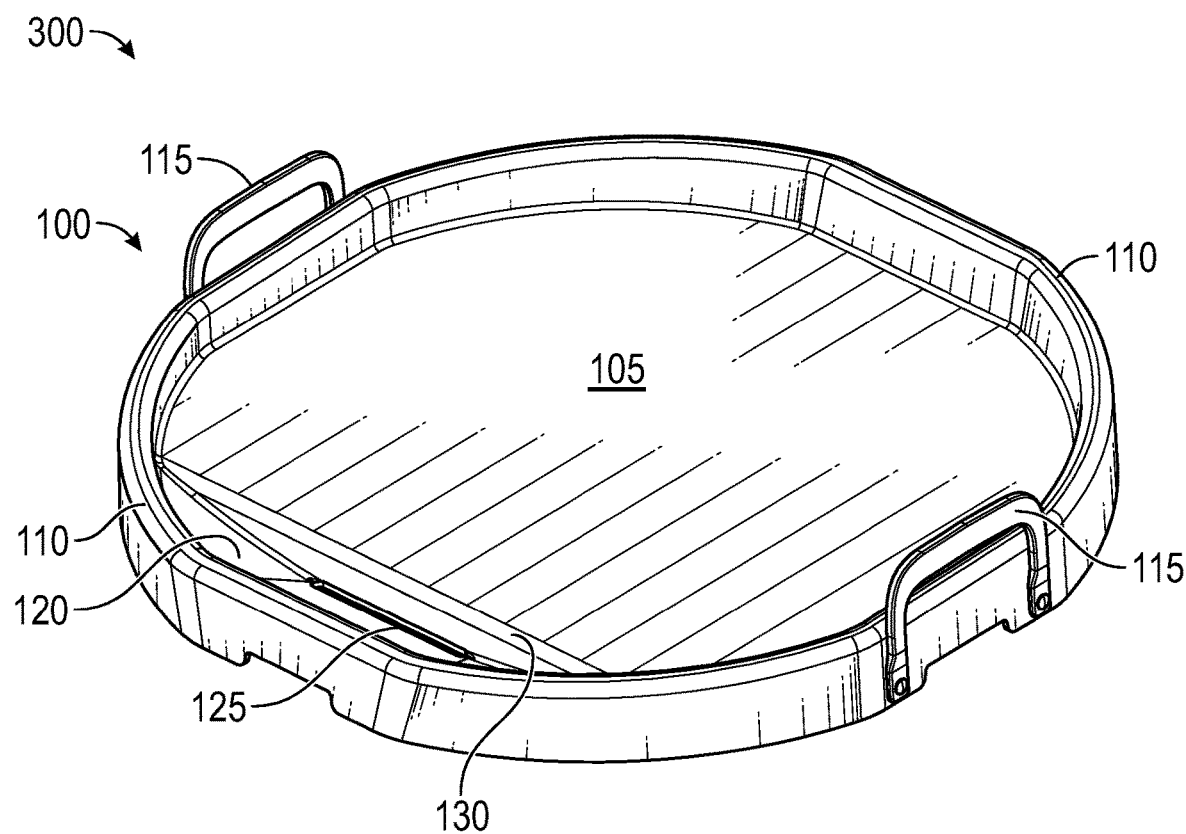
FIG. 4 is an exploded view of the exemplary system according to the solution.
Figure 4:
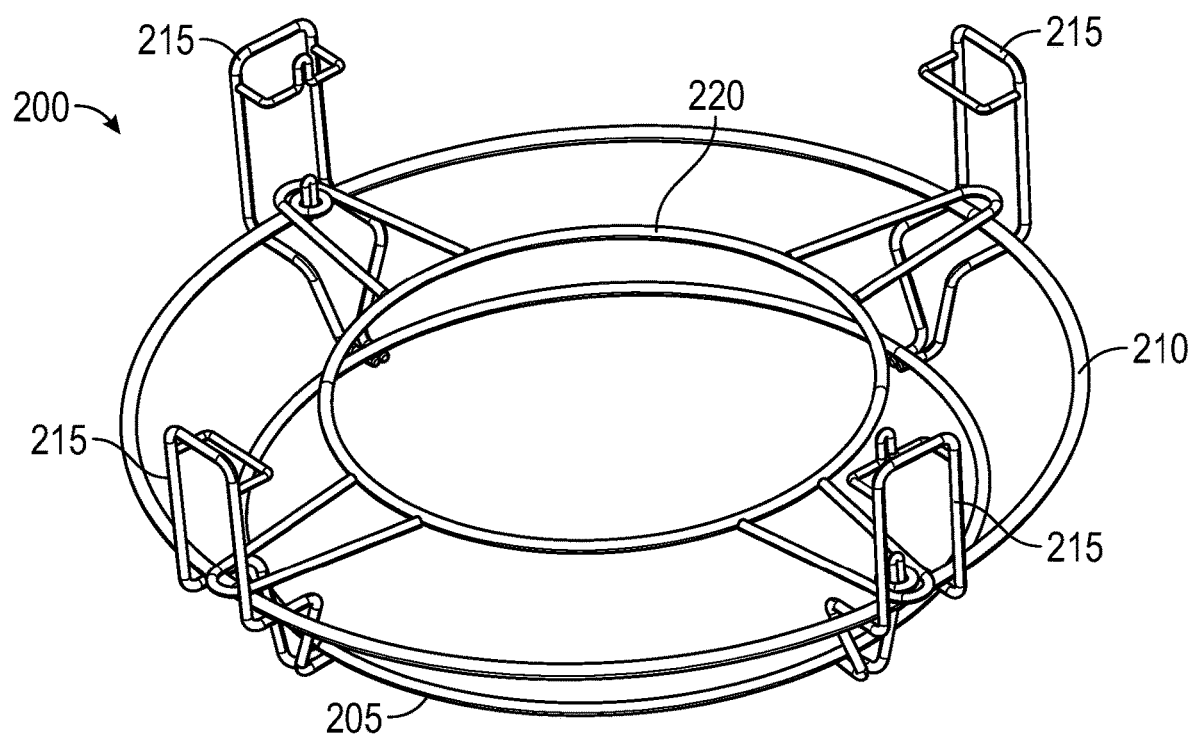
Figure 5:
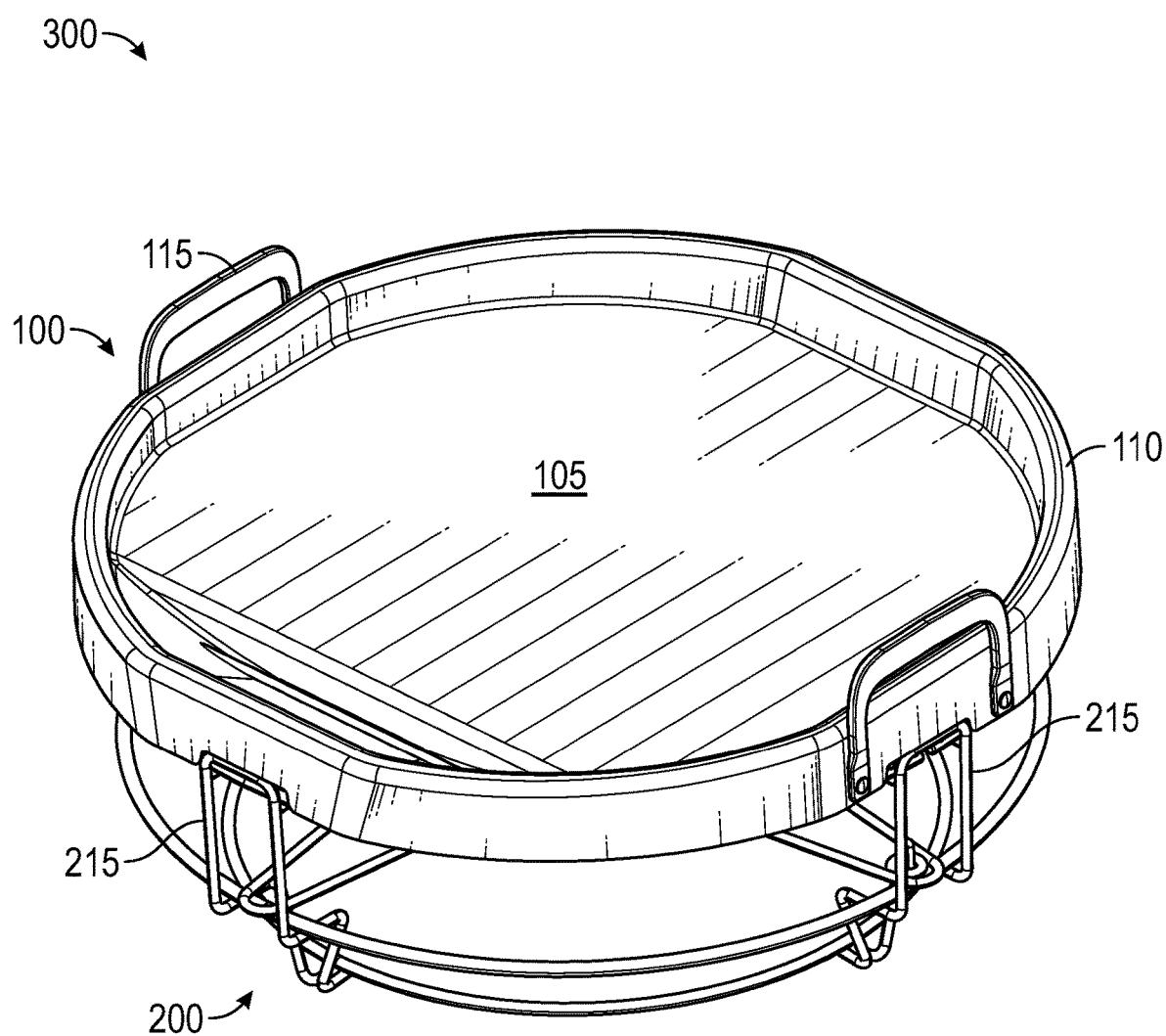
FIG. 5 illustrates the system of FIG. 4, wherein the griddle component is mounted atop the support rack configured to nest into a kamado cooker.

FIG. 4 is an exploded view of the exemplary system 300 according to the solution. And, FIG. 5 illustrates the system 300 of FIG. 4, wherein the griddle component 100 is mounted atop the support rack 200 configured to nest into a kamado cooker. The illustrations of FIGS. 4-5 will be described simultaneously.

The exemplary support rack 200 may take any number of forms, so long as it is configured to nest into a lower-bowl portion of a kamado cooker and is operable to support a griddle component 100 or other grilling/cooking accessory. The exemplary, non-limiting support rack 200 illustrated in the figures includes a base frame 205 and four post structures 215 evenly spaced circumferentially around the base frame 205. The four post structures 215 are anchored to the base frame 205 and rise vertically therefrom. An upper frame 210 that is concentric with the base frame 205 is mounted inside the four post structures 215 and provides lateral, structural rigidity to the support rack 200. A center frame 220 is suspended across the space defined by the upper frame 215 and provides additional structural rigidity and accessory support. The support rack 200 may be nested into the lower bowl-like portion of a cooker such that thermal energy generated by combusting fuel rises unobstructed through a space defined by the support rack 200.

As can be understood from the FIGS. 4 and 5 illustrations, the griddle component 100 may be received onto the four post structures 215 of the support rack 200 such that it is suspended over the combusting fuel. In this way, thermal energy rising from the combusting fuel in the lower bowl-like portion of the cooker comes into contact with the underside of the griddle component 100 and "heats it up" for cooking. Portions of the post structures 215 may be received into the channel 112 of the griddle component 100. Advantageously, sections of the channel 112 may be straight (i.e., non-curved) in order to more easily receive the post structures 215 and orient the griddle component 100. "Straight" sections of the channel 112/rim 110 can be understood from the various figures.

Figure 6:
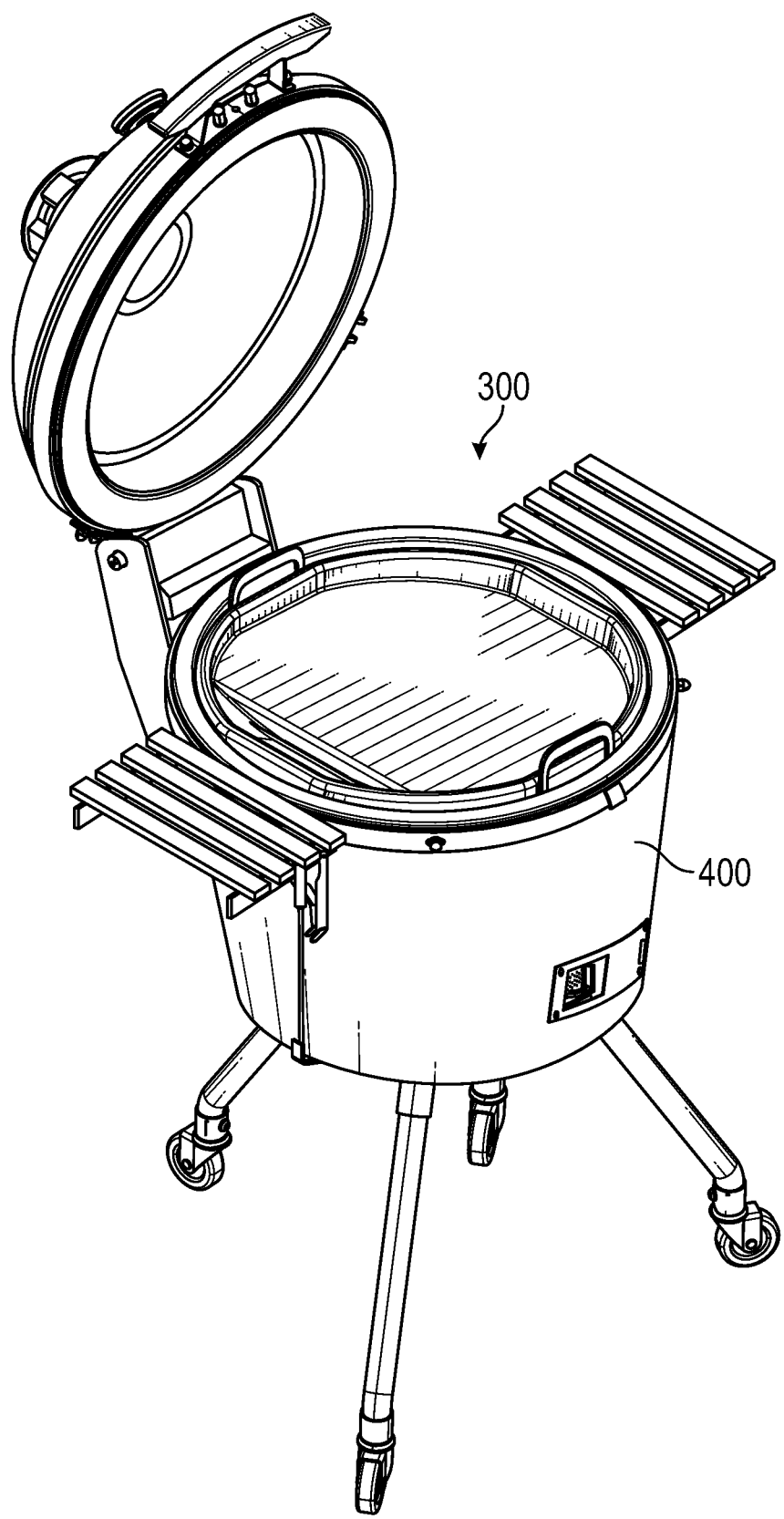
FIG. 6 illustrates the exemplary system of FIG. 4 installed into an exemplary kamado cooker.

FIG. 6 illustrates the exemplary system 300 of FIG. 4 installed into an exemplary lower bowl-like portion of a kamado cooker 400. As can be understood from the illustration, the support rack 200 is nested into the lower bowl of the kamado cooker 400 such that the griddle component 100 resting atop the support rack 200 is suspended over combusting fuel in the cooker. In the illustration, the griddle component 100 is oriented such that grease on the cooking surface 105 would drain to the left of a user standing in front of the cooker, although it is an advantage of the solution that the griddle component 100 may be oriented in any direction preferable to the user. That is, because the cooking surface 105 is sloped (relative to horizontal) toward the drain, any grease atop the cooking surface 105 will drain and be discarded beneath the griddle component 100 to be consumed by the combusting fuel regardless of the orientation of the griddle component 100.

A system according to the solution for conversion of a kamado cooker to a griddle has been described using detailed descriptions of embodiments thereof that are provided by way of example and are not intended to limit the scope of the disclosure. The described embodiments comprise different features, not all of which are required in all embodiments of the solution. Some embodiments of the solution utilize only some of the features or possible combinations of the features. Variations of embodiments of the solution that are described and embodiments of the solution comprising different combinations of features noted in the described embodiments will occur to persons of the art.

It will be appreciated by persons skilled in the art that a system according to the solution for conversion of a kamado cooker to a griddle is not limited by what has been particularly shown and described herein above. Rather, the scope of the solution is defined by the claims that follow.

What is claimed is:

1. A system for conversion of a kamado cooker to a griddle, the system comprising:
    a support rack configured to seat within a lower bowl portion of a kamado cooker, the support rack defining a plurality of vertical post structures; and
    a substantially round griddle component approximating an interior shape of the lower bowl portion of the kamado cooker and defining a sloped cooking surface, the griddle component comprising:
        a circumferential rim aspect at least partially surrounding the sloped cooking surface; and
        a drain slot;
    wherein the griddle component is configured to be received and supported by the plurality of vertical post structures of the support rack; and
    wherein the drain slot is positioned to discard grease from the sloped cooking surface at a point beneath the griddle component.

2. The system for conversion of a kamado cooker to a griddle of claim 1, wherein the griddle component further comprises one or more handles.

3. The system for conversion of a kamado cooker to a griddle of claim 2, wherein the one or more handles is comprised of at least one of stainless steel and chrome.

4. The system for conversion of a kamado cooker to a griddle of claim 1, wherein the griddle component is comprised of carbon steel.

5. The system for conversion of a kamado cooker to a griddle of claim 1, wherein the griddle component is comprised of a non-stick surface treatment.

6. The system for conversion of a kamado cooker to a griddle of claim 1, wherein the support rack comprises a base frame and an upper frame that are concentric.

7. The system for conversion of a kamado cooker to a griddle of claim 6, wherein the support rack further comprises a center frame.

8. The system for conversion of a kamado cooker to a griddle of claim 1, wherein the support rack is comprised of at least one of stainless steel and chrome.

9. The system for conversion of a kamado cooker to a griddle of claim 1, wherein the griddle component defines a channel beneath the rim aspect that is configured to receive the plurality of vertical post structures.

10. The system for conversion of a kamado cooker to a griddle of claim 1, wherein the rim aspect defines one or more straight sections.

\* \* \* \* \*